(No Model.)
C. D. CUTTS & E. E. SCATES.
HANDLE FOR TINWARE
No. 443,039. Patented Dec. 16, 1890.
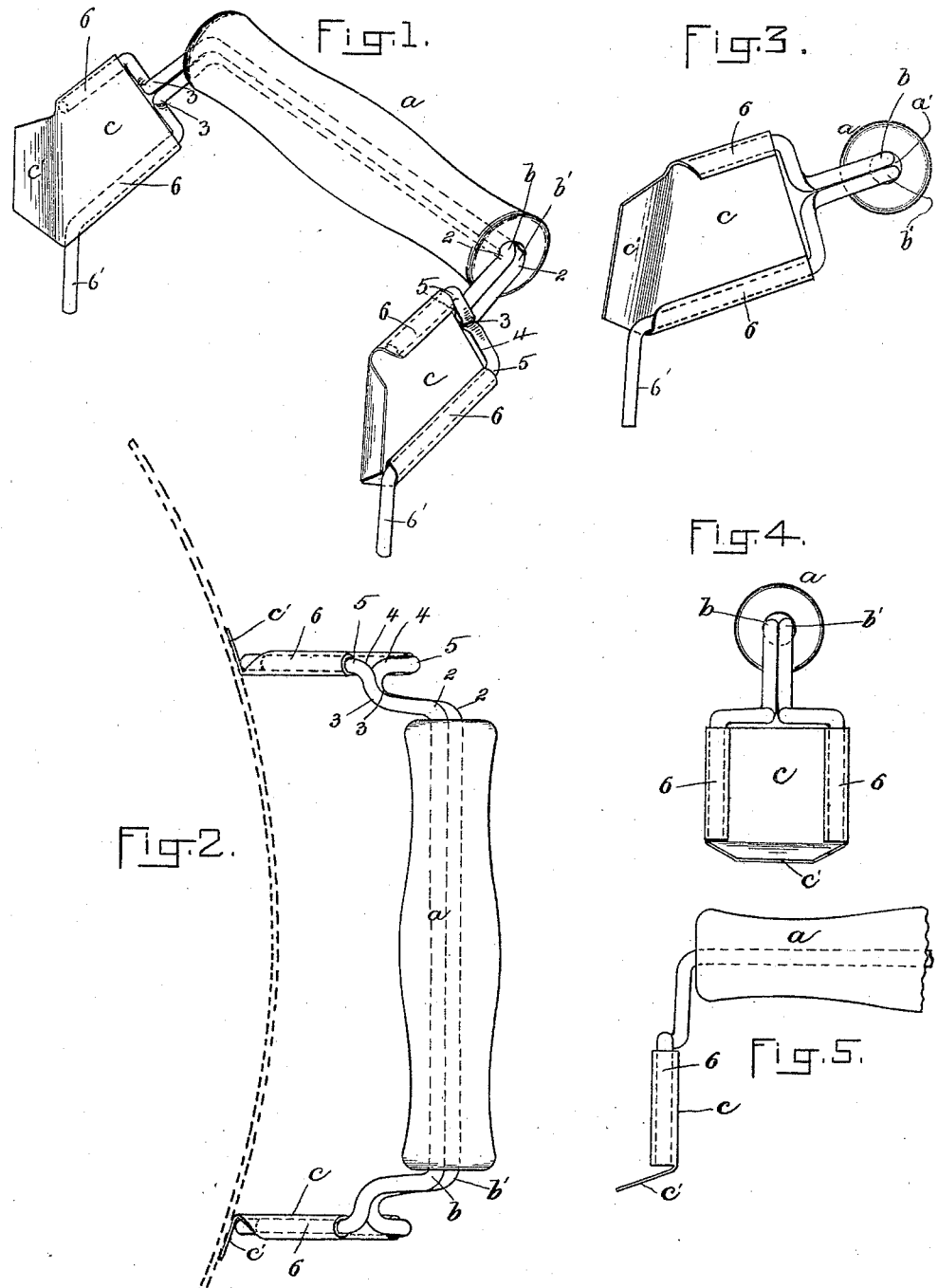

UNITED STATES PATENT OFFICE.

CHARLES D. CUTTS AND EBEN EVANS SCATES, OF FORT FAIRFIELD, MAINE.

HANDLE FOR TINWARE.

SPECIFICATION forming part of Letters Patent No. 443,039, dated December 16, 1890.

Application filed May 1, 1890. Serial No. 350,131. (No model.)

*To all whom it may concern:*

Be it known that we, CHARLES D. CUTTS and EBEN EVANS SCATES, both of Fort Fairfield, in the county of Aroostook and State of Maine, have invented certain new and useful Improvements in Handles for Tinware, of which the following is a specification.

This invention has for its object to provide a strong and durable handle for articles of tinware, such as wash-boilers, covers for pots and kettles, &c.; and it consists in a handle comprising two bent wires, a wooden piece through which said wires pass, and outside of which the wires are bent to form parallel holders, and two sheet-metal ears secured to the said holders and adapted to be soldered or otherwise secured to the article to which the handle belongs, as we will now proceed to describe.

Of the accompanying drawings, forming a part of this specification, Figure 1 represents a perspective view of our improved handle formed for application to the end of a wash-boiler. Fig. 2 represents a top view, and Fig. 3 an end view, of the same. Fig. 4 represents an end view, and Fig. 5 a side view, showing the handle formed to be attached to the top of a cover for a pot or kettle.

The same letters of reference indicate the same parts in all the figures.

In the drawings, $a$ represents a wooden piece formed to be grasped by the hand, and having a hole $a'$, extending longitudinally through it.

$b\ b'$ represent two lengths of wire, which are inserted in the hole $a'$ and project from both ends of the piece $a$, said wire pieces being of such size that they closely fit the hole and prevent the piece $a$ from turning upon them. At the ends of the piece $a$ the wires $b\ b'$ are bent at right angles, as shown at 2 2, and are extended parallel with each other and close together to the points 3 3, where they are offset or bent outwardly to the points 4 4. At these points the wires are bent in opposite directions and extend to the points 5 5, where they are again bent to form two prongs or holders 6 6, which are parallel with each other. The parts of the wire outside the handle therefore constitute arms which terminate in the separated parallel prongs 6 6.

$c\ c$ represent sheet-metal ears, the edges of which are rolled to form hollow beads or sockets arranged to receive the arms or holders 6 6. Said ears are formed in any suitable way to rest on and be secured to the vessel or article to which the handle belongs. When the article is a wash-boiler, the ears have flanges $c'\ c'$, formed to bear against the curved vertical walls of the boiler, as shown in Figs. 1, 2, and 3. In this case we prefer to extend the lower arm or holder 6 beyond the ear $c$ and bend the extended portion 6', so that it will bear on the body of the vessel to which the ear is soldered and constitute an extended bearing, which will support a portion of the strain on the handle and prevent the ears from being wrenched from the vessel. When the handle is used on a cover, the ears may be formed as shown in Figs. 4 and 5.

It will be seen that the two wires formed as described and terminating in the parallel holders or prongs 6 6 6 6 make the connection with the ears very secure, and that the device as a whole is very strong and durable. The two wires also enable the handle to be applied to different uses, as shown in the drawings, it being adapted to wash-boilers, &c., by making the end flanges $c'\ c'$ diagonal, and to covers by making said flanges square.

We claim—

1. The improved handle composed of the wooden piece $a$, the two wires $b\ b'$, passed through the piece $a$ and bent outside the same to form the arms terminating in the separated parallel prongs or holders 6 6, and the ears $c\ c$, attached at their edges to the said prongs or holders, as set forth.

2. The improved handle composed of the wooden piece $a$, the two wires $b\ b'$, passed through the piece $a$ and bent outside the same to form the arms terminating in the separated parallel prongs or holders 6 6, one of said holders being elongated and bent to form the extensions 6' 6', and the ears $c\ c$, attached to said prongs, the said extensions 6' projecting below said ears, as set forth.

In testimony whereof we have signed our names to this specification, in the presence of two subscribing witnesses, this 26th day of April, A. D. 1890.

CHAS. D. CUTTS.
    E. EVANS SCATES.

Witnesses:
 C. F. BROWN,
 A. D. HARRISON.